(12) United States Patent
Ishigooka et al.

(10) Patent No.: US 12,536,094 B2
(45) Date of Patent: Jan. 27, 2026

(54) VEHICLE CONTROL DEVICE

(71) Applicant: HITACHI ASTEMO, LTD., Hitachinaka (JP)

(72) Inventors: Tasuku Ishigooka, Tokyo (JP); Kazuyoshi Serizawa, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 171 days.

(21) Appl. No.: 18/009,896

(22) PCT Filed: Jun. 10, 2021

(86) PCT No.: PCT/JP2021/022058
§ 371 (c)(1),
(2) Date: Dec. 13, 2022

(87) PCT Pub. No.: WO2022/004324
PCT Pub. Date: Jan. 6, 2022

(65) Prior Publication Data
US 2023/0222050 A1   Jul. 13, 2023

(30) Foreign Application Priority Data
Jul. 3, 2020   (JP) .................................. 2020-115578

(51) Int. Cl.
*G06F 11/3668*   (2025.01)
*B60R 16/023*   (2006.01)

(52) U.S. Cl.
CPC ........ *G06F 11/368* (2013.01); *B60R 16/0231* (2013.01); *G06F 11/3692* (2013.01)

(58) Field of Classification Search
CPC . G06F 11/368; G06F 11/3692; B60R 16/0231
See application file for complete search history.

(56) References Cited

U.S. PATENT DOCUMENTS

| | | | | |
|---|---|---|---|---|
| 5,630,135 A | * | 5/1997 | Orimo ................. | G06F 11/1487 717/170 |
| 2007/0288189 A1 | * | 12/2007 | Mishuku ............. | G06F 11/2273 702/182 |

(Continued)

FOREIGN PATENT DOCUMENTS

| | | | | | |
|---|---|---|---|---|---|
| CN | 109818778 A | * | 5/2019 | | |
| CN | 110674024 A | * | 1/2020 | ............ | G06F 11/368 |
| CN | 111597558 A | * | 8/2020 | ............. | G06F 21/57 |

(Continued)

OTHER PUBLICATIONS

International Search Report with English Translation and Written Opinion in International Application No. PCT/JP2021/022058, dated Aug. 31, 2021.

*Primary Examiner* — Philip Wang
(74) *Attorney, Agent, or Firm* — Foley & Lardner LLP

(57) ABSTRACT

A vehicle control device includes a verification management unit that executes old control software unit 112 representing an old version of control software and new control software unit 113 representing a new version of control software in sequence or in parallel, and an output verification unit that when an output value from old control software unit 112 and an output value from new control software unit 113 do not match, outputs information indicating the output values' not matching.

9 Claims, 19 Drawing Sheets

(56) References Cited

U.S. PATENT DOCUMENTS

2011/0154339 A1* 6/2011 Lee ..................... G06F 9/5027
                                                       718/100
2019/0317806 A1   10/2019 Isoda

FOREIGN PATENT DOCUMENTS

| CN | 113986742 A  * | 1/2022 |             |
|----|----------------|--------|-------------|
| DE | 102020005352 A1 * | 3/2022 | ........... B60W 50/14 |
| JP | 2005-018598 A  | 1/2005 |             |
| JP | 2010067188 A * | 3/2010 |             |
| JP | 2017-097516 A  | 6/2017 |             |
| JP | 2019-032656 A  | 2/2019 |             |
| JP | 6571897 B2     | 9/2019 |             |
| WO | WO-2021166167 A1 * | 8/2021 | .......... G06F 11/1487 |

* cited by examiner

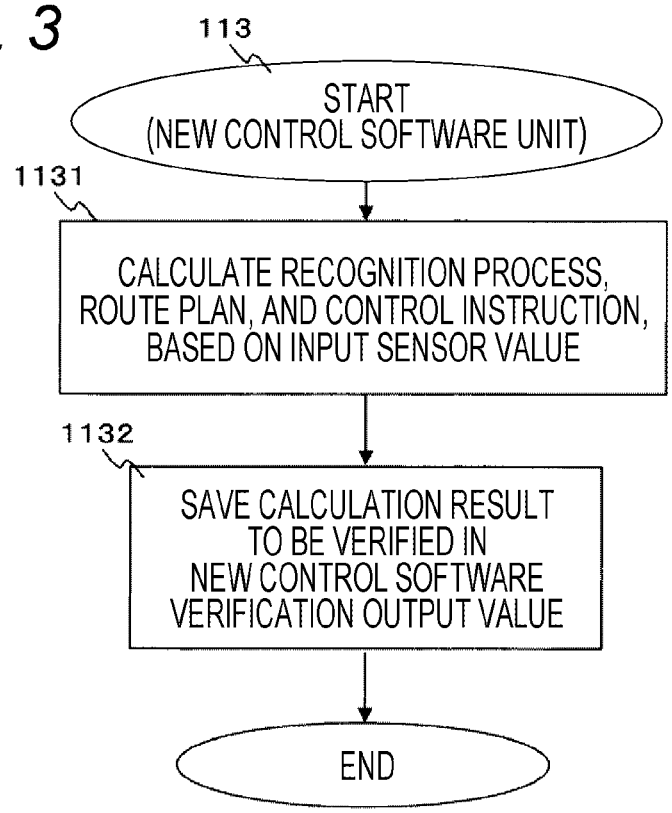
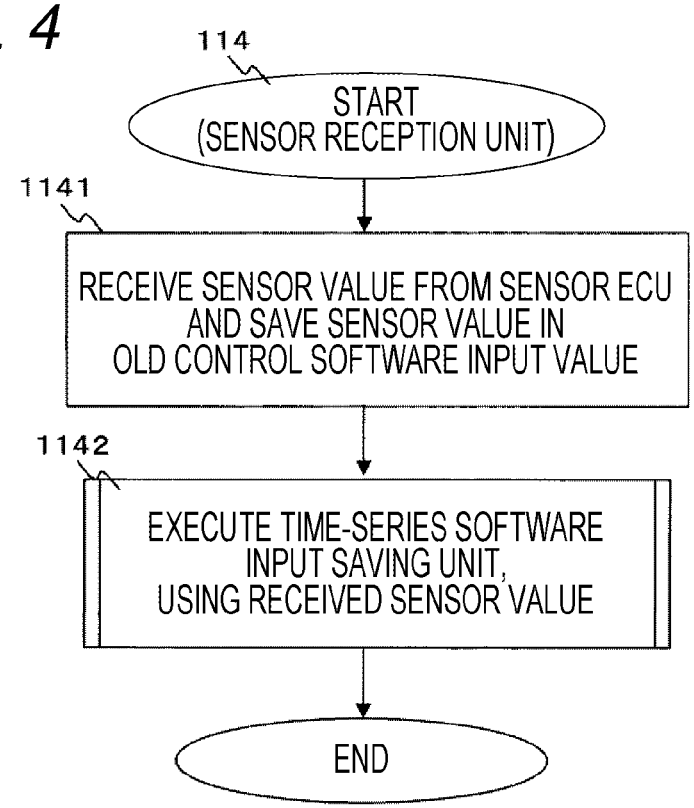

VEHICLE CONTROL DEVICE

TECHNICAL FIELD

The present invention relates to a vehicle control device.

BACKGROUND ART

An autonomous driving system includes a plurality of electronic control units (ECU). For example, the autonomous driving system includes an ECU that recognizes an external environment, such as a camera, an autonomous driving ECU that determines a traveling route, based on recognized external environment information, and an actuator ECU that controls steering or the like to cause a vehicle to travel according to a determined route.

With an autonomous driving system advanced further, the autonomous driving system making a decision and executing an operation of traveling, turning, and stopping in place of the driver, control software that carried out external environment recognition, traveling route planning, and vehicle control has become more and more complicated.

Building a high-quality autonomous driving system requires sufficient testing. However, because of enormous operation conditions for the system, designing test cases including a rarely arising situation turns out to be difficult. When control software involving machine learning is adopted, in particular, there may be a case where control software with improved precision for a specific situation shows low precision in a different situation. A verification method with high comprehensiveness is, therefore, in demand.

CITATION LIST

Patent Literature

PTL 1: JP 6571897 B2

SUMMARY OF INVENTION

Technical Problem

A technique described in PTL 1 is a technique related to control software running on a multi-core processor. According to this technique, a processing result of first software and a processing result of second software which is partially modified, the processing results being obtained from the same test case, are compared with each other to estimate the validity of sequential processing and the cause of a flaw in the sequential processing.

According to PTL 1, however, the test case is designed in advance and therefore a verification quality depends on the test case. This poses a problem that high comprehensiveness, which the present invention seeks, cannot be achieved.

The present invention has been conceived to solve the above problem, and it is therefore an object of the present invention to provide a vehicle control device that in an onboard configuration, can identifies an execution condition that affects the precision of control software, from output values from an old version of control software (old control software unit) and a new version of control software (new control software unit).

Solution to Problem

In order to achieve the above object, a vehicle control device of the present invention includes: a verification management unit that executes an old control software unit representing an old version of control software and a new control software unit representing a new version of control software in sequence or in parallel; and an output verification unit that when an output value from the old control software unit and an output value from the new control software unit do not match, outputs information indicating the output values' not matching.

Advantageous Effects of Invention

According to the present invention, an execution condition that affects the precision of control software can be identified from outputs values from the old control software unit and the new control software unit. Problems, configurations, and effects that are not described above will be clarified by the following description of embodiments.

BRIEF DESCRIPTION OF DRAWINGS

FIG. 3 is a process flow of a new control software unit according to the first embodiment.

FIG. 4 is a process flow of a sensor reception unit according to first, second, and third embodiments.

DESCRIPTION OF EMBODIMENTS

Embodiments of the present invention will now be described with reference to the drawings.

The embodiments of the present invention will hereinafter be described with reference to the drawings.

A vehicle control device according to an embodiment of the present invention saves sensor information for a certain period of time in a time-series manner in an onboard configuration. A test case is generated from the saved time-series sensor information, and old control software and new control software are executed in the test case, based on an in-verification time different from a real time. By comparing an output result of the old control software with an output result of the new control software, an execution condition that affects the precision of control software can be identified. Because verification is carried out using an idle resource (time, CPU) not used for executing the old control software, an autonomous driving system can be verified as verification cost is kept low.

First Embodiment

Figure 1:
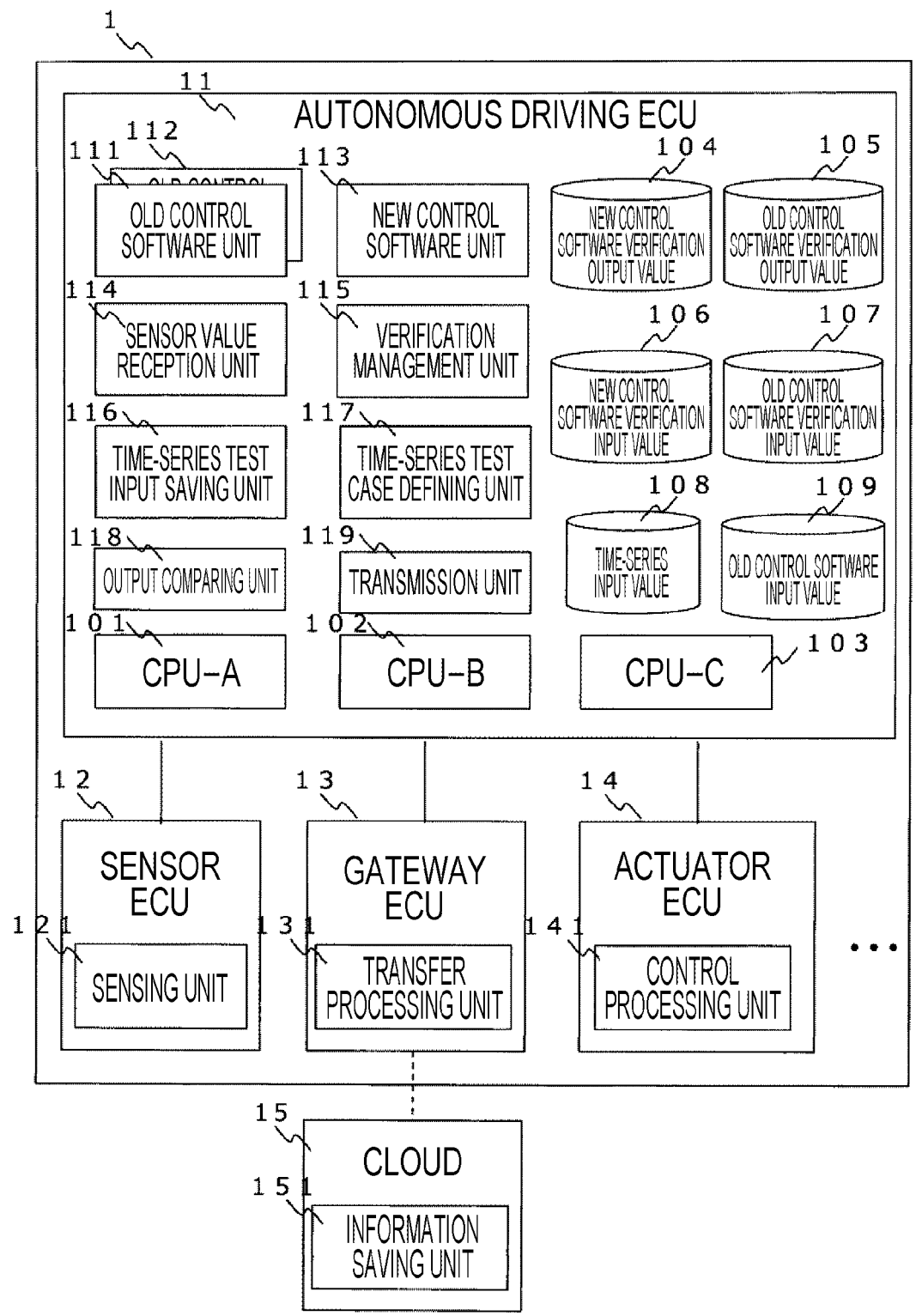
FIG. 1 is a configuration diagram of a system and a vehicle control device according to a first embodiment.

FIG. 1 is a configuration diagram of a system and a vehicle control device according to a first embodiment of the present invention. An autonomous driving system 1 includes an autonomous driving ECU 11, a sensor ECU 12, a gateway ECU 13, an actuator ECU 14, and a cloud 15. The autonomous driving ECU 11 can communicate with the sensor ECU 12, the gateway ECU 13, and the actuator ECU 14, and can transmit and receive data to and from the cloud 15 via the gateway ECU 13.

The autonomous driving ECU 11 includes an old control software unit 111, an old control software unit 112, a new control software unit 113, a sensor value reception unit 114, a verification management unit 115, a time-series test input saving unit 116, a time-series test case defining unit 117, an output comparing unit 118, and a transmission unit 119.

The autonomous driving ECU 11 is equipped with a CPU-A 101, a CPU-B 102, and a CPU-C 103, and further includes a new control software verification output value 104, an old control software verification output value 105, a new control software verification input value 106, an old control software verification input value 107, a time-series input value 108, and an old control software input value 109.

The sensor ECU 12 includes a sensing unit 121. The gateway ECU 13 includes a transfer processing unit 131. The actuator ECU 14 includes a control processing unit 141. The cloud 15 includes an information saving unit 151.

Details of an operation flow according to the first embodiment will hereinafter be described.

Figure 2:
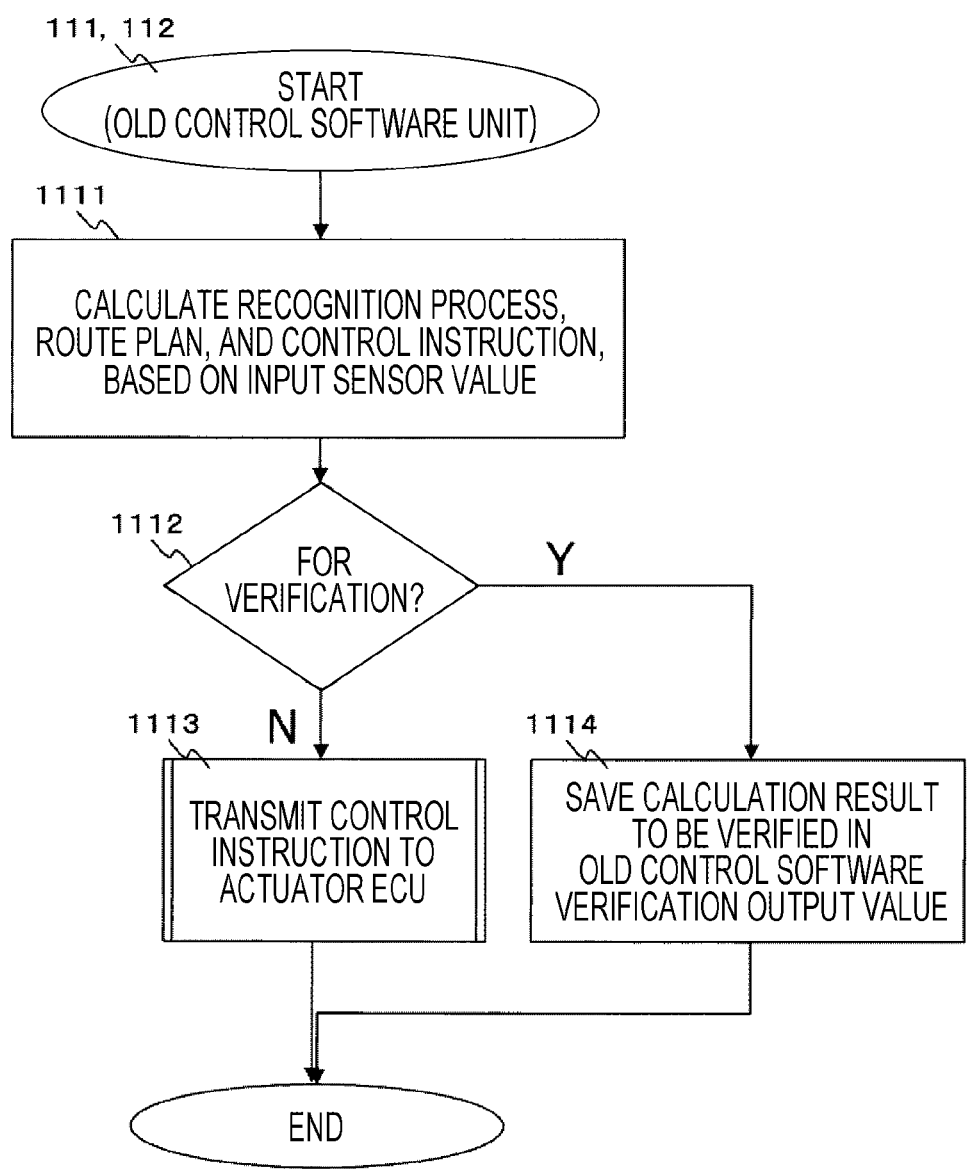
FIG. 2 is a process flow of old control software units according to the first embodiment.

FIG. 2 is a process flow of the old control software unit 111 and the old control software unit 112. Steps shown in FIG. 2 will hereinafter be described.

(FIG. 2: Step 1111)

The old control software unit 111 or 112 calculates a recognition process, a route plan, and a control instruction, based on an input sensor value. The old control software unit 111 reads a sensor value from the old control software input value 109, and the old control software unit 112 acquires a sensor value by referring to the old control software verification input value 107.

(FIG. 2: Step 1112)

The old control software unit 111 or 112 determines whether the old control software unit 111 or 112 itself is a program used in the verification. When giving a determination "false" (N: NO), the old control software unit 111 or 112 proceeds to step 1113, and when giving a determination "true" (Y: YES), proceeds to step 1114.

(FIG. 2: Step 1113)

The old control software unit 111 or 112 transmits a control instruction to the actuator ECU, using the transmission unit 119.

(FIG. 2: Step 1114)

The old control software unit 111 or 112 saves a calculation result to be verified in the old control software verification output value 105.

FIG. 3 is an operation flow of the new control software unit 113. Steps shown in FIG. 3 will hereinafter be described.

(FIG. 3: Step 1131)

The new control software unit 113 calculates a recognition process, a route plan, and a control instruction, based on an input sensor value.

(FIG. 3: Step 1132)

The new control software unit 113 saves a calculation result to be verified in the new control software verification output value 104.

FIG. 4 is an operation flow of the sensor value reception unit 114. Steps shown in FIG. 4 will hereinafter be described.

(FIG. 4: Step 1141)

The sensor value reception unit 114 receives a sensor value from the sensor ECU 12, and saves the sensor value in the old control software input value 109.

(FIG. 4: Step 1142)

The sensor value reception unit 114 executes the time-series software input saving unit 116, using the received sensor value as input.

Figure 5:
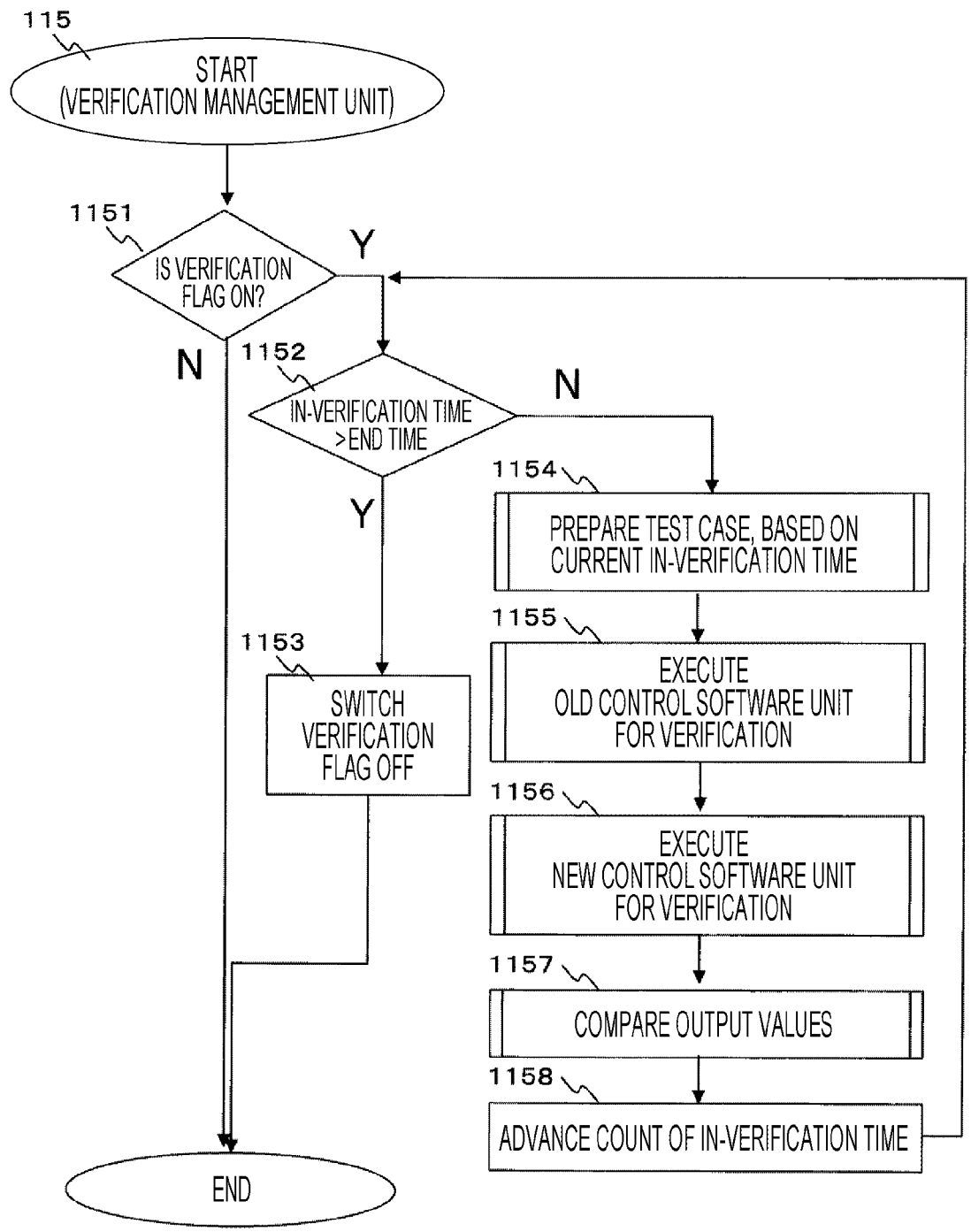
FIG. 5 is a process flow of a verification management unit according to the first and third embodiments.

FIG. 5 is an operation flow of the verification management unit 115. Steps shown in FIG. 5 will hereinafter be described.

(FIG. 5: Step 1151)

The verification management unit 115 determines whether a verification flag is ON. When giving a determination "false" (N: NO), the verification management unit 115 ends the operation flow. When giving a determination "true" (Y: YES), the verification management unit 115 proceeds to step 1152.

(FIG. 5: Step 1152)

The verification management unit 115 determines whether an in-verification time exceeds a verification end time. When giving a determination "true" (Y: YES), the verification management unit 115 proceeds to step 1153, and when giving a determination "false" (N: NO), proceeds to step 1154. It is assumed that the in-verification time is reset at the start of the vehicle control device.

(FIG. 5: Step 1153)

After resetting the in-verification time, the verification management unit 115 switches the verification flag off.

(FIG. 5: Step 1154)

The verification management unit 115 executes the time-series test case defining unit 117 to acquire a test case corresponding to a current in-verification time.

(FIG. 5: Step 1155)

The verification management unit 115 executes the old control software unit 112 for verification, using the test case as input.

(FIG. 5: Step 1156)

The verification management unit 115 executes the new control software unit 113 for verification, using the test case as input.

(FIG. 5: Step 1157)

The verification management unit 115 executes the output comparing unit 118 in order to compare an output value from the old control software unit 112 with an output value from the new control software unit 113.

(FIG. 5: Step 1158)

The verification management unit 115 advances the count of the in-verification time, and proceeds to step 1152.

Figure 6:
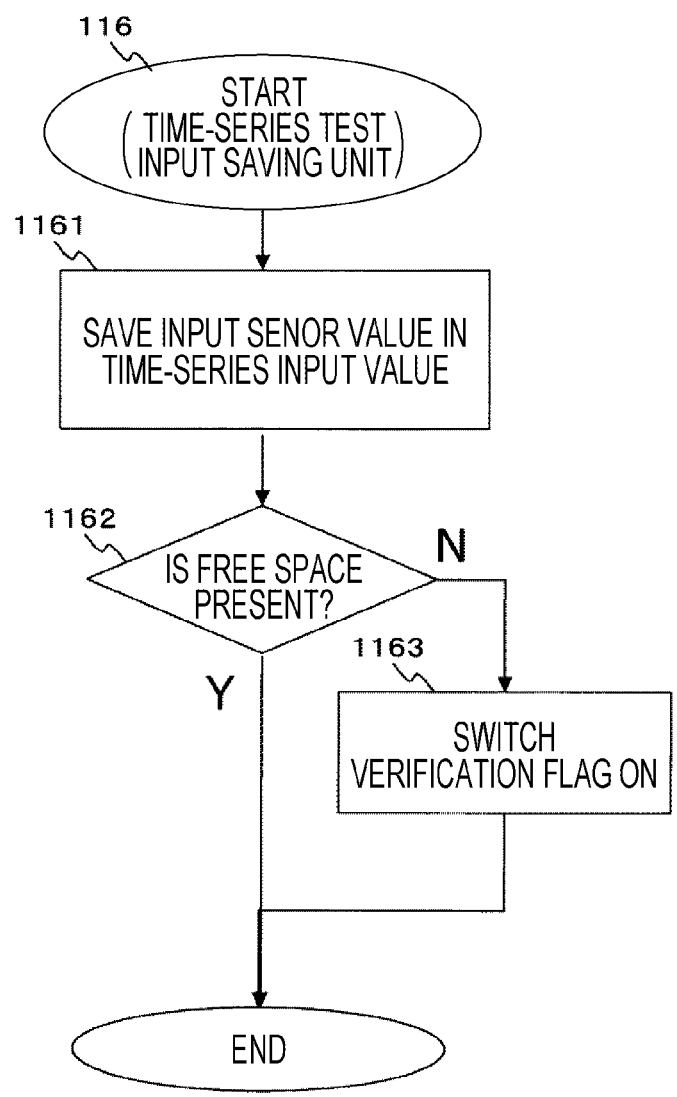
FIG. 6 is a process flow of a time-series test input saving unit according to the first, second, and third embodiments.

FIG. 6 is an operation flow of the time-series test input saving unit 116. Steps shown in FIG. 6 will hereinafter be described.

(FIG. 6: Step 1161)

The time-series test input saving unit 116 saves an input sensor value in the time-series input value 108.

(FIG. 6: Step 1162)

The time-series test input saving unit 116 determines whether a free space is present in a memory. When giving a determination "true" (Y: YES), the time-series test input saving unit 116 ends the operation flow, and when giving a determination "false" (N: NO), proceeds to step 1163. In this embodiment, an end condition for saving the sensor value and a condition for starting verification are set as conditions that a free space is present in the memory. Condition setting, however, is not limited to this. For example, saving the sensor value for a certain period of time may be defined as the end condition. Furthermore, the end condition and the start condition may be set as different conditions. For example, the end condition may be a condition that a free space in the memory is equal to or smaller than a space of a given size, and the start condition may be a condition that a CPU load is equal to or smaller than a given CPU load value (FIG. 6: Step 1163)

The time-series test input saving unit 116 turns the verification flag on.

Figure 7:
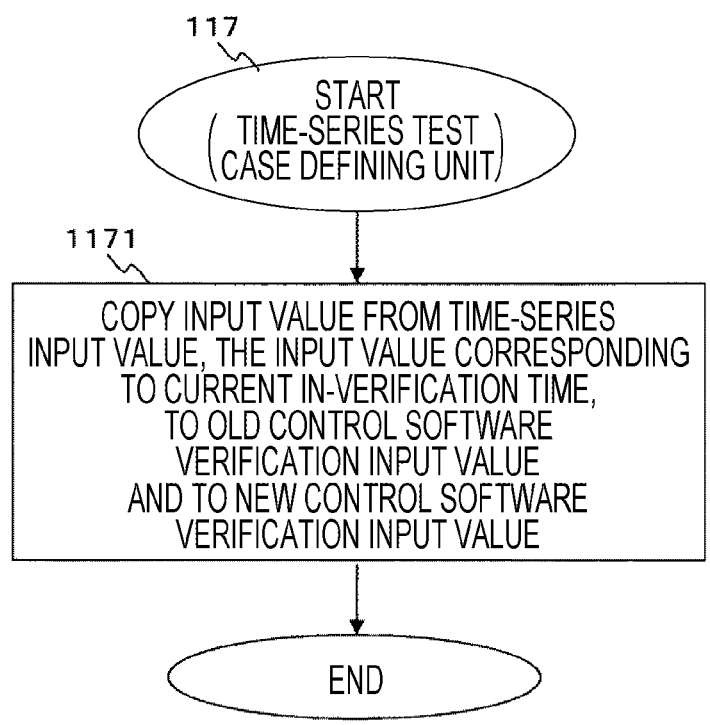
FIG. 7 is a process flow of a time-series test case defining unit according to the first, second, and third embodiments.

FIG. 7 is an operation flow of the time-series test case defining unit 117. Steps shown in FIG. 7 will hereinafter be described.

(FIG. 7: Step 1171)

The time-series test case defining unit 117 copies an input value from the time-series input value 108, the input value corresponding to the current in-verification time, to the old control software verification input value 107 and to the new control software verification input value 106.

Figure 8:
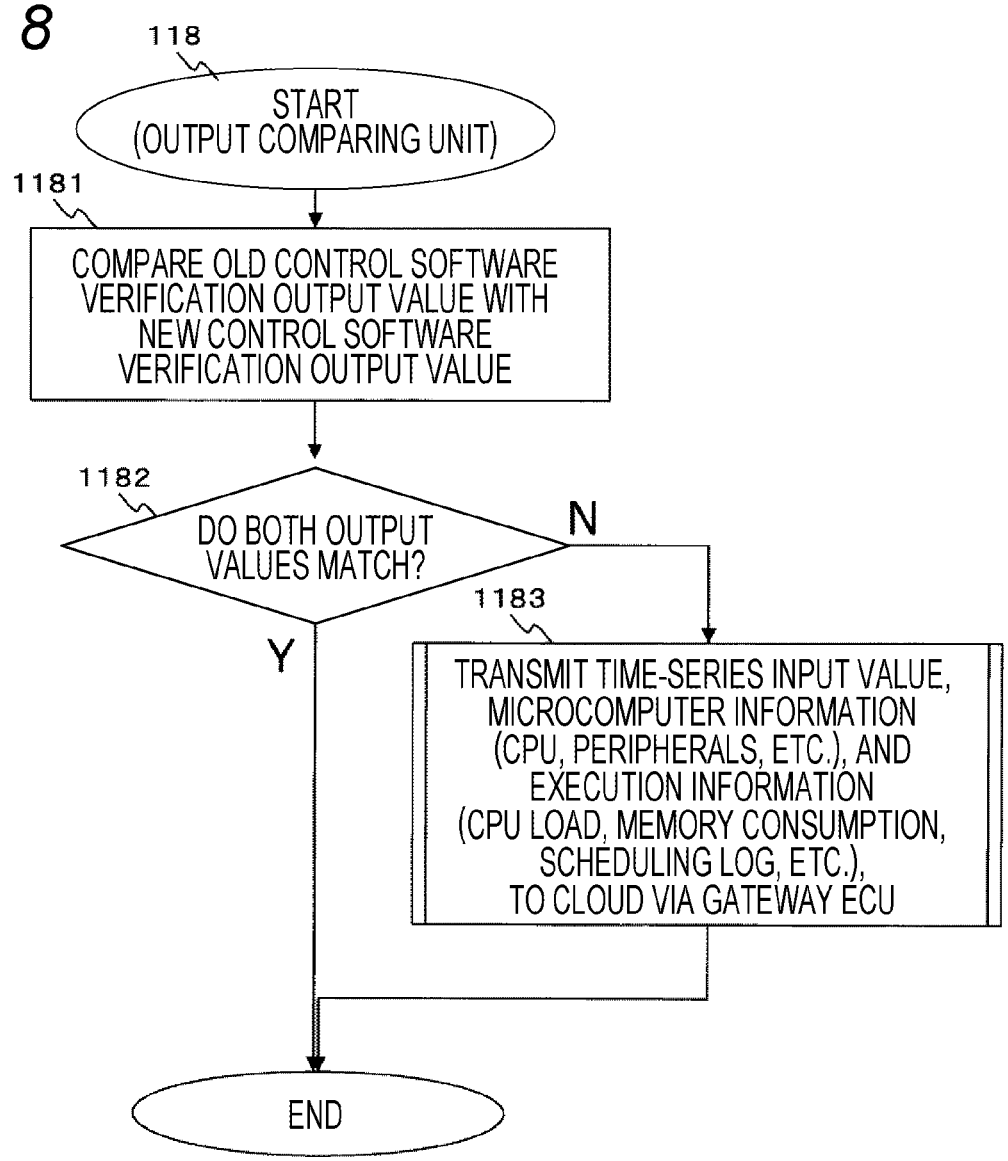
FIG. 8 is a process flow of an output comparing unit according to the first, second, and third embodiments.

FIG. 8 is an operation flow of the output comparing unit 118. Steps shown in FIG. 8 will hereinafter be described.

(FIG. 8: Step 1181)

The output comparing unit 118 compares the old control software verification output value 105 with the new control software verification output value 104.

(FIG. 8: Step 1182)

The output comparing unit 118 determines whether a comparison result indicates that the old control software verification output value 105 and the new control software verification output value 104 match. When giving a determination "true" (Y: YES), the output comparing unit 118 ends the operation flow, and when giving a determination "false" (N: NO), proceeds to step 1183. In this embodiment, whether an output result is valid is determined by seeing if the output result matches another output result to be compared therewith. A method of determining the validity of the output result, however, is not limited to this. For example, the validity may be determined by comparing each output value with a preset correct answer value. The correct answer value refers to a condition posing a possibility of reaching a dangerous state. The correct answer value, however, is not limited to such a condition.

A dangerous state mentioned here is a state in which an abnormal value (e.g., a value that is out of place in a scene or a value that lacks continuity) is outputted. Specifically, for example, it refers to a state in which an object that is out of place in an expressway is identified or a state in which an AI, in its object recognition, suddenly recognizes an object it has recognized so far as a "person", as a "cat".

For example, an output verification unit compares each of an output value from the old control software unit 112 and an output value from the new control software unit 113 with the correct answer value, and when at least one of the compared output values is different from the correct answer value, outputs information indicating the output value's not matching the correct answer value.

(FIG. 8: Step 1183)

The output comparing unit 118 transmits the time-series input value 108, microcomputer information (CPU, peripherals, etc.), execution information (CPU load, memory consumption, scheduling log, etc.), and the like, to the cloud 15 via the gateway ECU. In this embodiment, these pieces of information are transmitted to the cloud. Transmission of the information, however, is not limited to this case. For example, the information may be saved on a storage device, such as a drive recorder incorporated in the vehicle including the output comparing unit 118.

Figure 9:
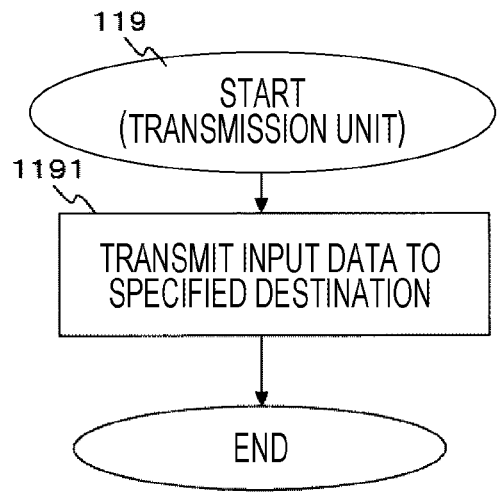
FIG. 9 is a process flow of a transmission unit according to the first, second, and third embodiments.

FIG. 9 is an operation flow of the transmission unit 119. Steps shown in FIG. 9 will hereinafter be described.

(FIG. 9: Step 1191)

The transmission unit 119 transmits input data to a specified destination. The specified destination is, for example, the actuator ECU 14 or the cloud 15.

Figure 10:
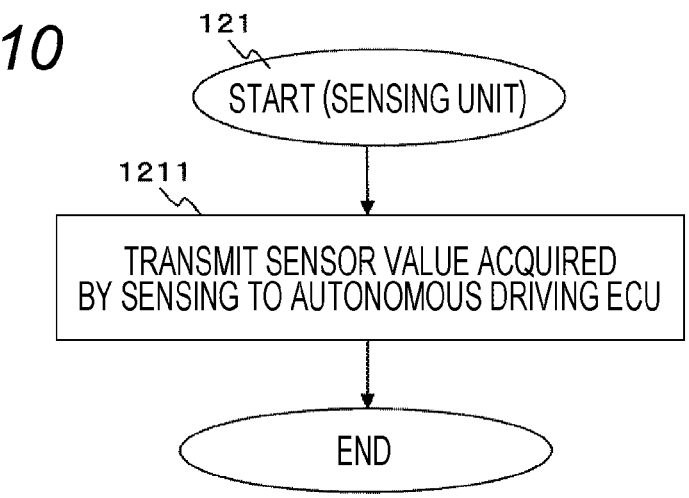
FIG. 10 is a process flow of a sensing unit according to the first, second, and third embodiments.

FIG. 10 is an operation flow of the sensing unit 121. Steps shown in FIG. 10 will hereinafter be described.

(FIG. 10: Step 1211)

Sensing unit 121 transmits a sensor value obtained by sensing, to the autonomous driving ECU 11.

Figure 11:
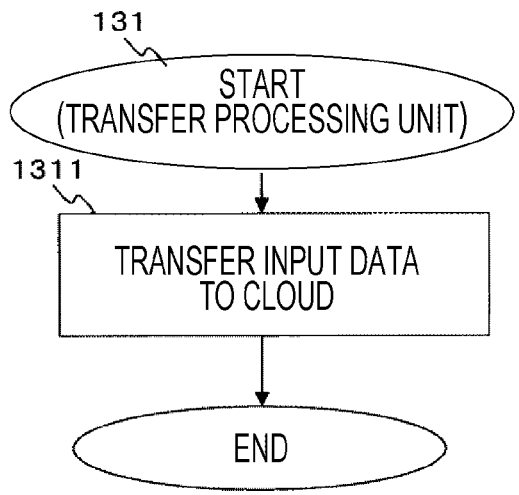
FIG. 11 is a process flow of a transfer processing unit according to the first, second, and third embodiments.

FIG. 11 is an operation flow of the transfer processing unit 131. Steps shown in FIG. 11 will hereinafter be described.

(FIG. 11: Step 1311)

The transfer processing unit 131 transfers input data to the cloud 15.

Figure 12:
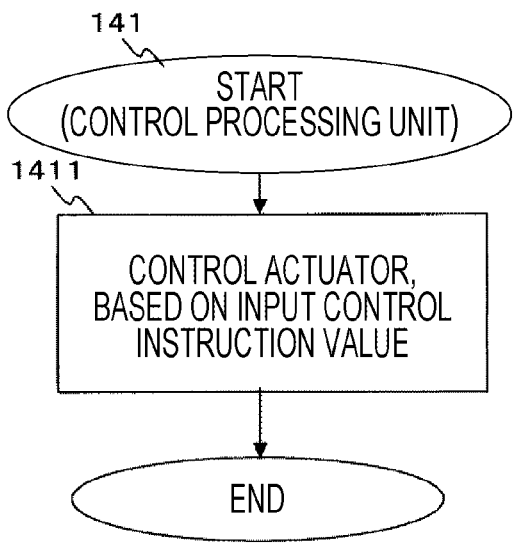
FIG. 12 is a process flow of a control processing unit according to the first, second, and third embodiments.

FIG. 12 is an operation flow of the control processing unit 141. Steps shown in FIG. 12 will hereinafter be described.

(FIG. 12: Step 1411)

The control processing unit 141 controls an actuator, based on an input control instruction value.

Figure 13:
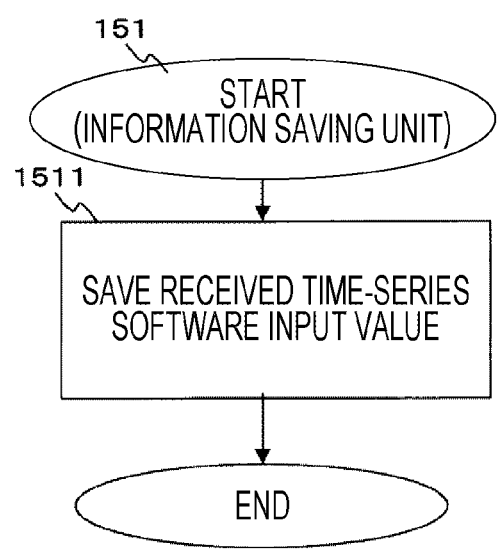
FIG. 13 is a process flow of an information saving unit according to the first, second, and third embodiments.

FIG. 13 is an operation flow of the information saving unit 151. Steps shown in FIG. 13 will hereinafter be described.

(FIG. 13: Step 1511)

The information saving unit 151 saves the received time-series input value 108, microcomputer information (CPU, peripherals, etc.), execution information (CPU load, memory consumption, scheduling log, etc.), and the like.

Figure 14:
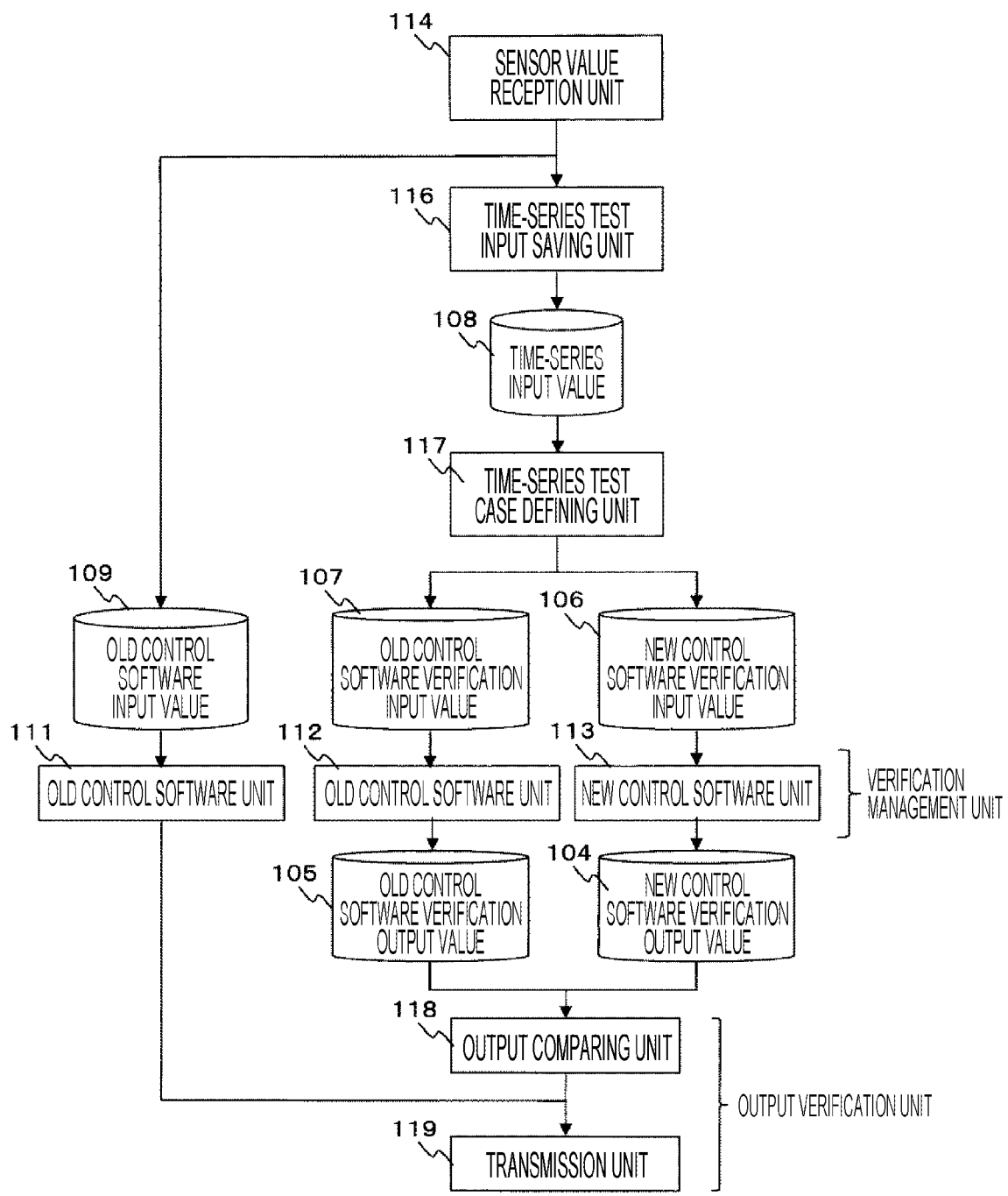
FIG. 14 is a data flow of the vehicle control device according to the first embodiment.

FIG. 14 is a data flow of the vehicle control device according to the first embodiment.

The sensor value reception unit 114 inputs a received sensor value to the time-series test input saving unit 116. The sensor value reception unit 114 saves the received sensor value in the old control software input value 109. The old control software unit 111 carries out a calculation, based on an input sensor value, and transmits a result of the calculation through the transmission unit 119.

The time-series test input saving unit 116 saves an input sensor value in the time-series input value 108. In other words, the time-series test input saving unit 116 saves a time-series input value that is an input value acquired in time sequence by a sensor of the running vehicle.

The time-series test case defining unit 117 saves a sensor value from the time-series input value 108, the sensor value being a saved sensor value corresponding to the in-verification time, in the old control software verification input value 107 and in the new control software verification input value 106. In other words, the time-series test case defining unit 117 selects a test case including an input value corresponding to the in-verification time, from the time-series input value.

The old control software unit 112 carries out a calculation, using the old control software verification input value 107 as input, and saves a result of the calculation in the old control software verification output value 105. The new control software unit 113 carries out a calculation, using the new control software verification input value 106 as input, and saves a result of the calculation in the new control software verification output value 104. The output comparing unit 118 compares the old control software verification output value 105 with the new control software verification output value 104, and transmits test condition information corresponding to a result of the comparison through the transmission unit.

Figure 20:
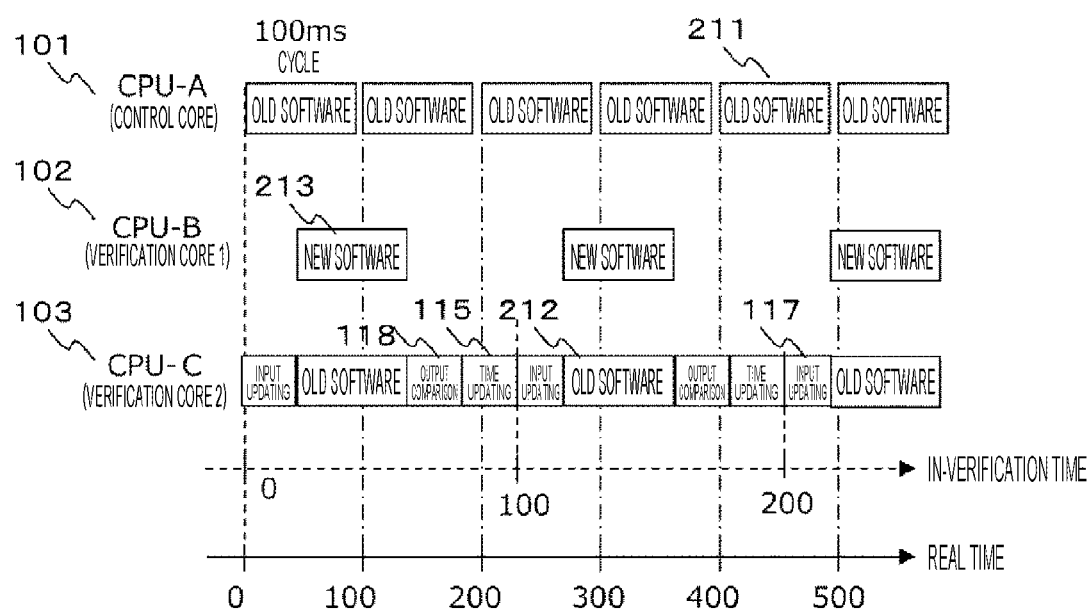
FIG. 20 is scheduling information of the vehicle control device according to the second embodiment.

In other words, the verification management unit executes the old control software unit 112 representing an old version of control software and the new control software unit 113 representing a new version of control software in sequence (see FIG. 15) or in parallel (see FIG. 20). When an output value from the old control software unit 112 and an output value from the new control software unit 113 do not match, the output verification unit outputs information indicating the output values' not matching. Specifically, for example, the output verification unit compares the output value from the old control software unit 112 with the output value from the new control software unit 113, and when the output values do not match, outputs information indicating the output values' not matching.

In this embodiment, the output verification unit includes the output comparing unit that outputs a time-series input value to the outside when an output value from the old control software unit 112 and an output value from the new control software unit 113 do not match.

Figure 15:
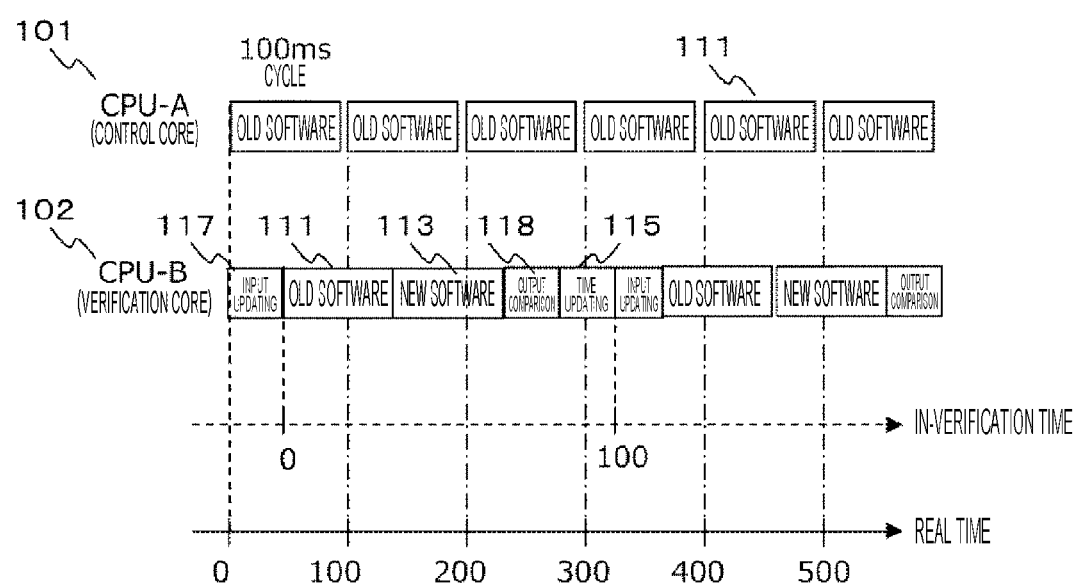
FIG. 15 is scheduling information of the vehicle control device according to the first embodiment.

FIG. 15 is scheduling information of the autonomous driving ECU 11 according to the first embodiment. In the first embodiment, the CPU-A 101 is used as a control core that executes a control process, and the CPU-B 102 is used as a verification core that executes a verification process. Specifically, the CPU-A 101 executes the old control software unit 111 at a 100 ms cycle. Meanwhile, the CPU-B 102 executes the verification process, based on the in-verification time. In other words, the output verification unit executes the verification process by the CPU-B 102 (processor) that is different from the CPU-A 101 (processor) for control, which executes the old control software unit 111.

As shown in FIG. 15, in the first embodiment, the old control software unit 112 and the new control software unit 113 are executed in sequence. In a configuration of the first embodiment, it is highly likely that a real time and the in-verification time do not match. To allow these times to match, it is necessary to end execution of both the old control software unit 112 and the new control software unit 113 within the execution cycle of the old control software unit 111. In this embodiment of the present invention, because the real time and the in-verification time are separated from each other, a microcomputer that is not a high-performance microcomputer capable of ending execution of both software units within the execution cycle can carry out the verification.

According to the first embodiment, the time-series input value is not always one type of input value. For example, the time-series input value may be time-series data indicating two or more types of sensor values. When the time-series input value is related to test conditions, the time-series input value is not always a sensor value.

According to the first embodiment, the time-series input value is not always an input value to the old control software unit or to the new control software unit. For example, the time-series input value may be intermediate data obtained by dividing input data to the old control software unit or to the new control software unit.

According to the first embodiment, data saved in the old control software verification output value or the new control software verification output value is not always a control instruction to the actuator ECU, the control instruction being calculated by the old control software unit or the new control software unit. For example, the data may be a result of a recognition process or determination process that is carried out based on machine learning.

According to the first embodiment, the condition for switching the verification flag on is a condition that a free space is not present in the memory (step 1162: NO in FIG. 6), but the condition is not limited to this. For example, the condition may be a condition that a sensor value has been saved for a certain period of time. Not limited to this, the condition may be defined as other conditions. For example, the condition may be a condition that the vehicle is in a predetermined specific state, such as a manual driving state or a parked state. Alternatively, it may be a condition that the verification flag is switched on when the CPU load becomes equal to or smaller than a preset CPU load value.

According to the first embodiment, the condition for switching the verification flag off is a condition that the in-verification time has exceeded the end time (step 1152: YES in FIG. 5), but the condition is not limited to this. For example, there may be a case where the verification flag is switched off in advance when a possibility of using many calculation resources in the future is high. It is assumed that such a case arises in a situation in which the vehicle is approaching a point where near-miss incidents frequently occur or a situation in which new software is installed, and situations corresponding to the above case are not limited to these situations.

According to the first embodiment, an output result from the old control software unit and an output result from the new control software unit are compared with each other. Other methods, however, may also be adopted. For example, a method may be adopted, by which the output results are compared respectively with a preset correct answer value or reference value and when results of the comparison do not match, a time-sequence input value is reported to the cloud. Not limited to this, the condition may be defined as other conditions.

According to the first embodiment, the time-series input value is reported to the cloud when the comparison results do not match. Data report to the cloud, however, is not limited to this. All time-series input values may be reported to the cloud or input values in time zones in which comparison results fail to match may be reported to the cloud. Further, an output value representing a calculation result may be sent together with the time-series input value, to the cloud. Other forms of data report to the cloud may also be performed. Data reported to the cloud is used for re-training the new control software unit or remedying its problem.

According to the first embodiment, two types of control software, i.e., the old control software unit and the new control software unit are compared with each other. Pieces of control software to be compared are, however, not limited to these. For example, two or more types of old control software units and of new control software units may be compared.

According to the first embodiment, because the time-series test case defining unit 117 selects a test case for the old control software units 111 and 112 and the new control software unit 113 that are to be verified, a time-series input value, an old control software verification input value, and a new control software verification input value do not need to match.

According to the first embodiment, the old control software unit and the new control software unit are alternately executed (FIG. 15). Execution of the old control software unit and new control software unit, however, is not limited to this. There may be a case where, for example, the old control software unit is executed first for a certain period of time, after which the in-verification time is counted backward, and then the new control software unit is executed for a certain period of time in a test case based on the in-verification time counted backward. Order of execution of the software units may be reverse to the above order of execution.

In other words, execution in sequence means, for example, executing the old control software unit in a certain period of an in-verification time and then executing the new control software unit in a certain period of an in-verification time, or executing the new control software unit in a certain period of an in-verification time and then executing the old control software unit in a certain period of an in-verification time.

The first embodiment is implemented on the assumption that the old control software unit and the new control software unit each occupy an independent memory space. For example, the old control software unit and the new control software unit may be executed in a thread pre-designed to have no common variable or executed separately in a process or executed separately in a container or executed separately in a hypervisor.

According to the first embodiment of the present invention, the old control software unit and the new control software unit can be verified using an idle CPU. Compared with a case of preparing a dedicated CPU for each of the old control software unit and the new control software unit, therefore, the verification can be carried out at lower cost.

Second Embodiment

Figure 16:
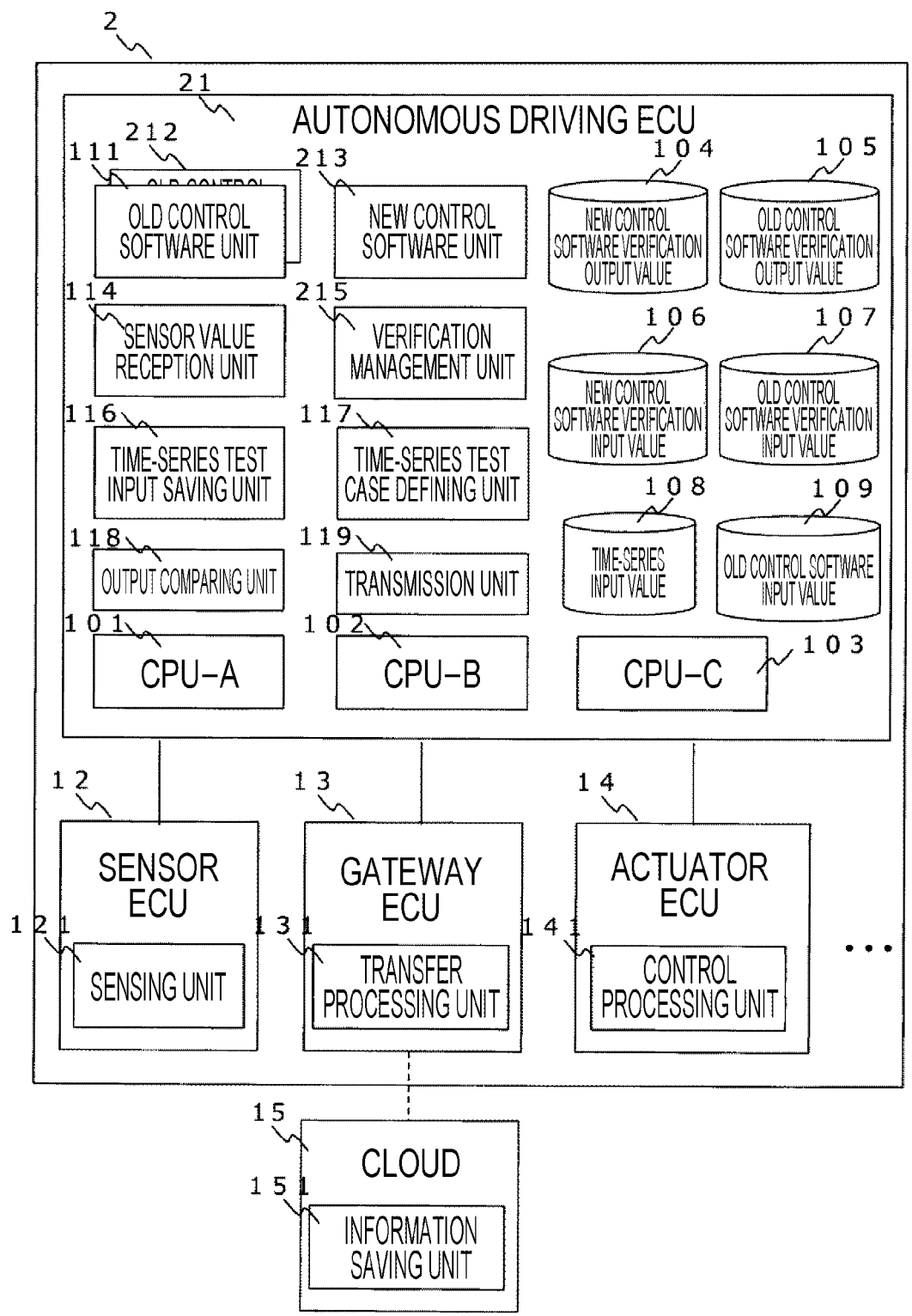
FIG. 16 is a configuration diagram of a system and a vehicle control device according to the second embodiment.

FIG. 16 is a configuration diagram of a system and a vehicle control device according to a second embodiment. An autonomous driving system 2 includes an autonomous driving ECU 21, plus the same ECUs as those of the first embodiment. The autonomous driving ECU 21 includes an old control software unit 212, a new control software unit 213, and a verification management unit 215, plus the same functional units as those of the first embodiment.

Details of an operation flow according to the second embodiment will hereinafter be described.

Figure 17:
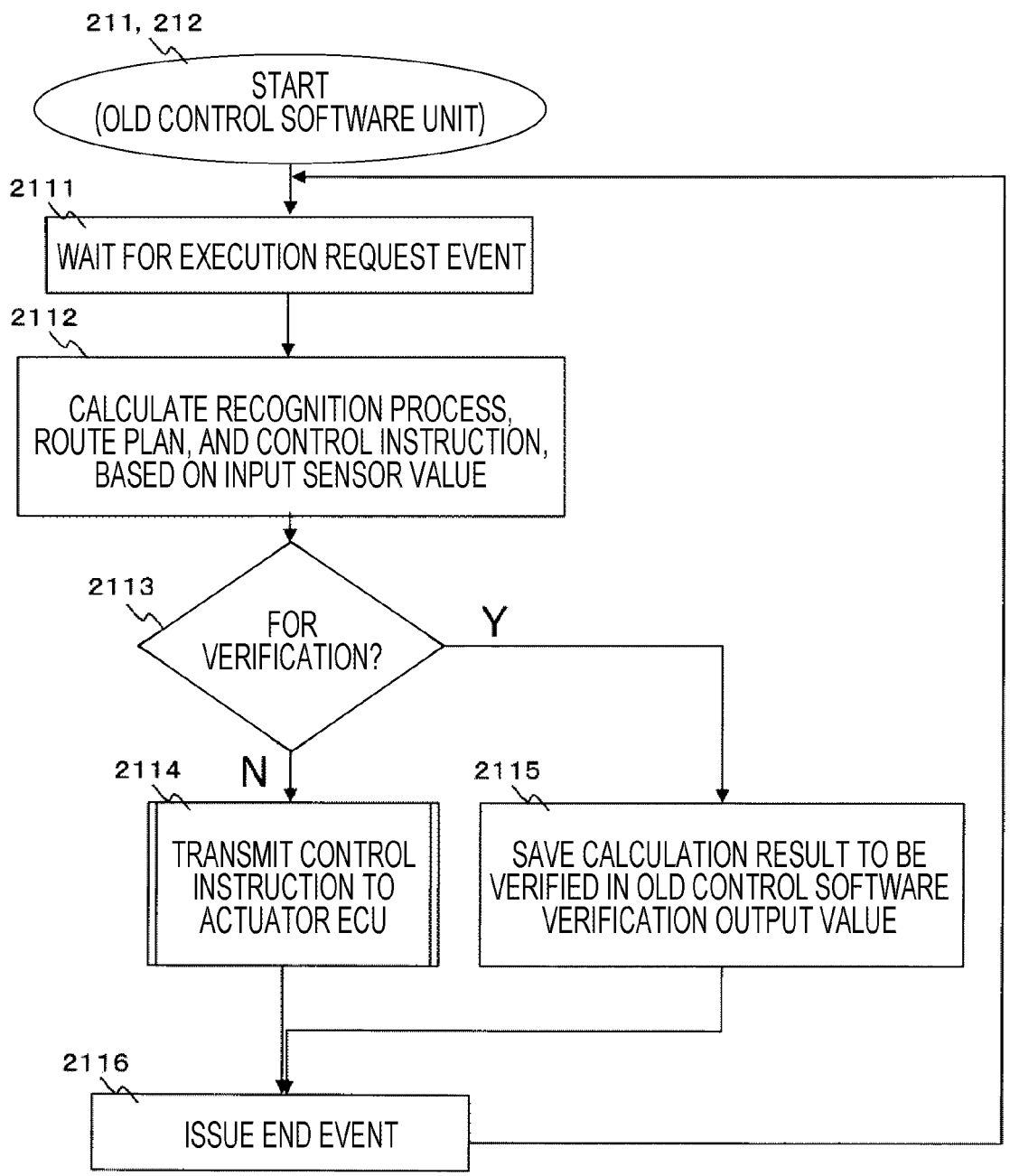
FIG. 17 is an operation flow of the old control software unit according to the second embodiment.

FIG. 17 is an operation flow of the old control software unit 212. Steps shown in FIG. 17 will hereinafter be described.

(FIG. 17: Step 2111)

The old control software unit 212 waits for an execution request event from the verification management unit 215. When the execution request event is issued, the old control software unit 212 proceeds to step 2112.

(FIG. 17: Step S2112)

The old control software unit 212 calculates a recognition process, a route plan, and a control instruction, based on an input sensor value. The old control software unit 212 reads a sensor value from the old control software input value 109, and the old control software unit 212 acquires a sensor value by referring to the old control software verification input value 107.

(FIG. 17: Step 2113)

The old control software unit 212 determines whether the old control software unit 212 itself is a program used in the verification. When giving a determination "false" (N: NO), the old control software unit 212 proceeds to step 2114, and when giving a determination "true" (Y: YES), proceeds to step 2115.

(FIG. 17: Step 2114)

The old control software unit 212 transmits a control instruction to the actuator ECU, using the transmission unit 119.

(FIG. 17: Step 2115)

The old control software unit 212 saves a calculation result to be verified in the old control software verification output value 105.

(FIG. 17: Step 2116)

The old control software unit 212 issues an end event.

Figure 18:
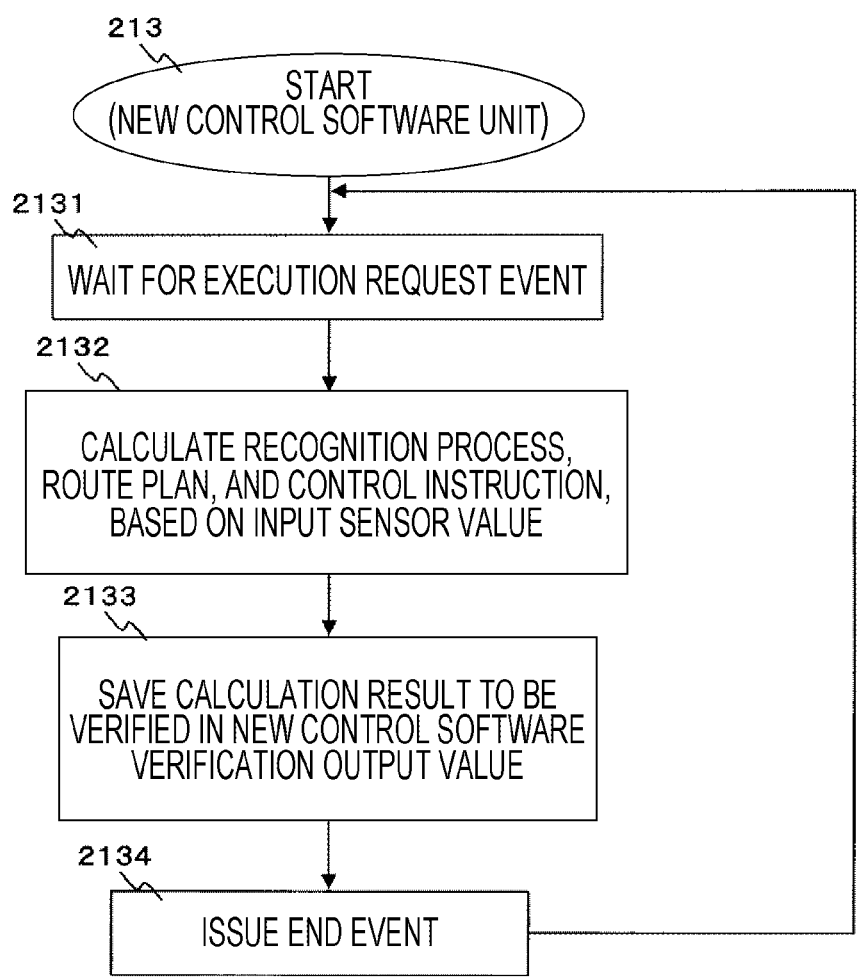
FIG. 18 is an operation flow of the new control software unit according to the second embodiment.

FIG. 18 is an operation flow of the new control software unit 213. Steps shown in FIG. 18 will hereinafter be described.

(FIG. 18: Step 2131)

The new control software unit 213 waits for an execution request event from the verification management unit 215. When the execution request event is issued, the new control software unit 213 proceeds to step 2132.

(FIG. 18: Step 2132)

The new control software unit 213 calculates a recognition process, a route plan, and a control instruction, based on an input sensor value.

(FIG. 18: Step 2133)

The new control software unit 213 saves a calculation result to be verified in the new control software verification output value 104.

(FIG. 18: Step 2134)

The new control software unit 213 issues an end event.

Figure 19:
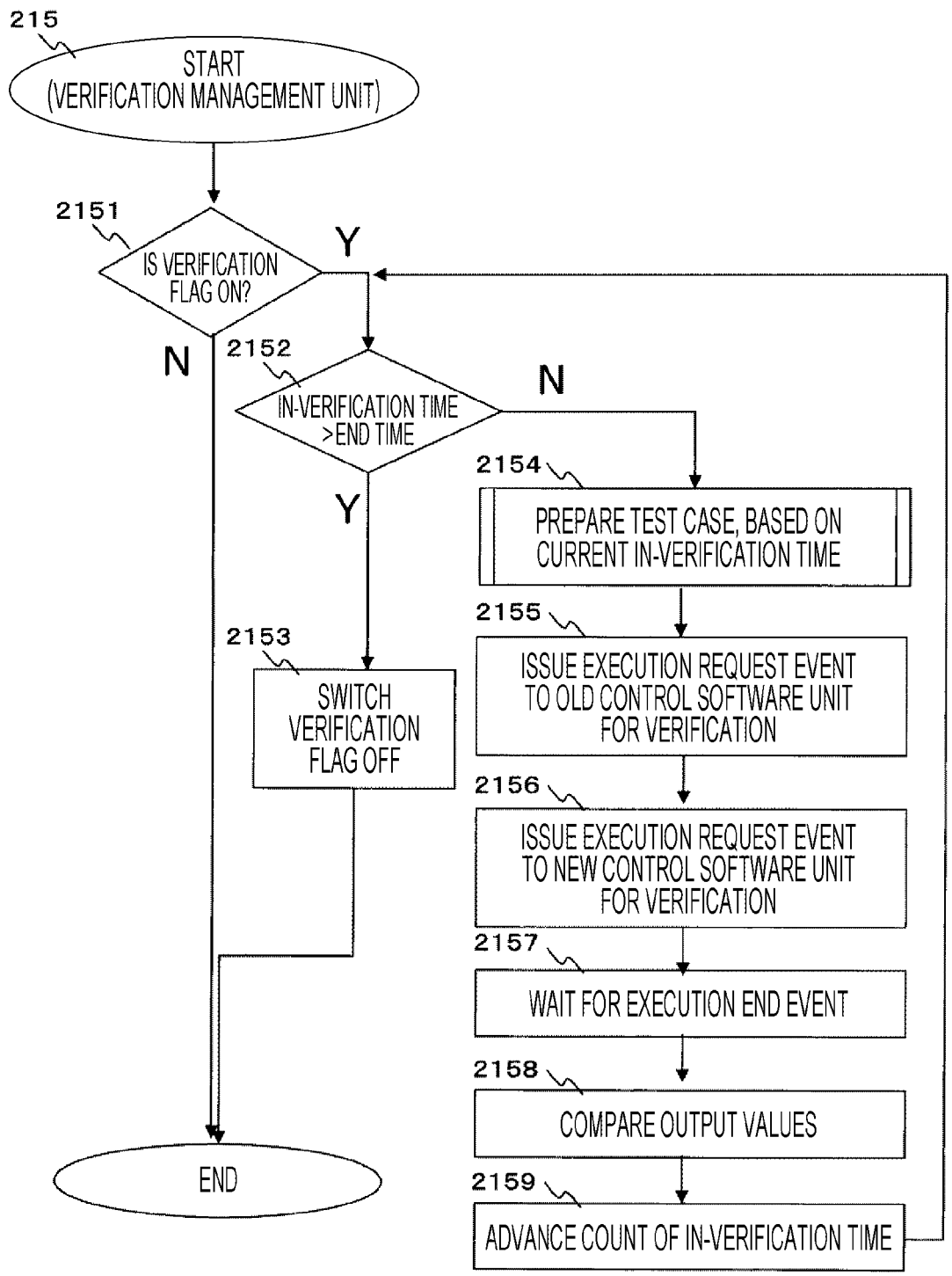
FIG. 19 is an operation flow of the verification management unit according to the second embodiment.

FIG. 19 is an operation flow of the verification management unit 215. Steps shown in FIG. 19 will hereinafter be described.

(FIG. 19: Step 2151)

The verification management unit 215 determines whether a verification flag is ON. When giving a determination "false" (N: NO), the verification management unit 215 ends this operation flow. When giving a determination "true" (Y: YES), the verification management unit 215 proceeds to step 2152.

(FIG. 19: Step 2152)

The verification management unit 215 determines whether an in-verification time exceeds a verification end time. When giving a determination "true" (Y: YES), the verification management unit 215 proceeds to step 2153, and when giving a determination "false" (N: NO), proceeds to step 2154. It is assumed that the in-verification time is reset at the start of the vehicle control device.

(FIG. 19: Step 2153)

After resetting the in-verification time, the verification management unit 215 switches the verification flag off.

(FIG. 19: Step 2154)

The verification management unit 215 executes the time-series test case defining unit 117 to acquire a test case corresponding to a current in-verification time.

(FIG. 19: Step 2155)

The verification management unit 215 issues an execution request event to the old control software unit 212 for verification, using the test case as input.

(FIG. 19: Step 2156)

The verification management unit 215 issues an execution request event to the new control software unit 213 for verification, using the test case as input.

(FIG. 19: Step 2157) The verification management unit 215 waits for execution end events issued from the old control software unit 212 and the new control software unit 213.

(FIG. 19: Step 2158)

The verification management unit 215 executes the output comparing unit 118 in order to compare an output value from the old control software unit 212 with an output value from the new control software unit 213.

(FIG. 19: Step 2159)

The verification management unit 215 advances the count of the in-verification time, and proceeds to step 2152.

In this manner, the verification management unit 215 manages the in-verification time indicating a time within a verification period, and executes the old control software unit 212 and the new control software unit 213, based on the in-verification time.

FIG. 20 is scheduling information of the autonomous driving ECU 21 according to the second embodiment. In the second embodiment, the CPU-A 101 is used as a control core that executes a control process, and the CPU-B 102 and the CPU-C 103 are used as verification cores that execute verification processes. Specifically, the CPU-A 101 executes the old control software unit 111 at a 100 ms cycle. Meanwhile, the CPU-B 102 and the CPU-C 103 executes the verification processes, based on the in-verification time.

In other words, execution in parallel means, for example, allocating the old control software unit and the new control software unit respectively to different processors (the CPU-B 102 and the CPU-C 103) and executing both software units in synchronization with each other, using the same test case.

As shown in FIG. 20, in the second embodiment, the old control software unit 212 is executed by the CPU-C 103 as the new control software unit 213 is executed by the CPU-B 102. In the second embodiment, the old control software unit 212 and the new control software unit 213 are executed in parallel. The in-verification time, therefore, turns out to be shorter, which is a feature of the second embodiment.

According to the second embodiment, because the old control software unit and the new control software unit can be verified using different CPUs, respectively, the time required for the verification can be shortened.

Third Embodiment

Figure 21:
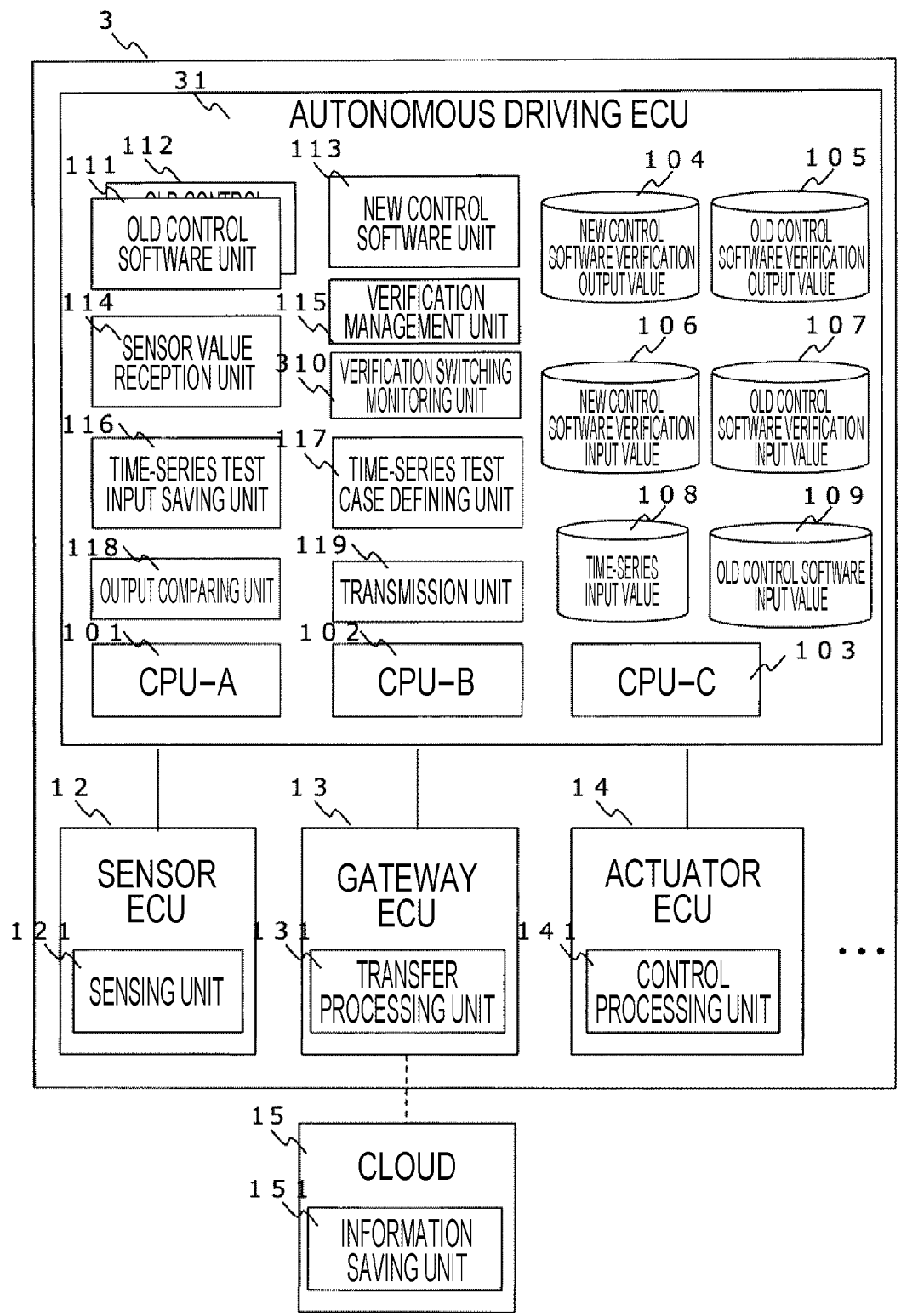
FIG. 21 is a configuration diagram, of a system and a vehicle control device according to a third embodiment.

FIG. 21 is a configuration diagram of a system and a vehicle control device according to a third embodiment. An autonomous driving system 3 includes an autonomous driving ECU 31, plus the same ECUs as those of the first embodiment. The autonomous driving ECU 31 includes a verification switching monitoring unit 310, plus the same functional units as those of the first embodiment.

Figure 22:
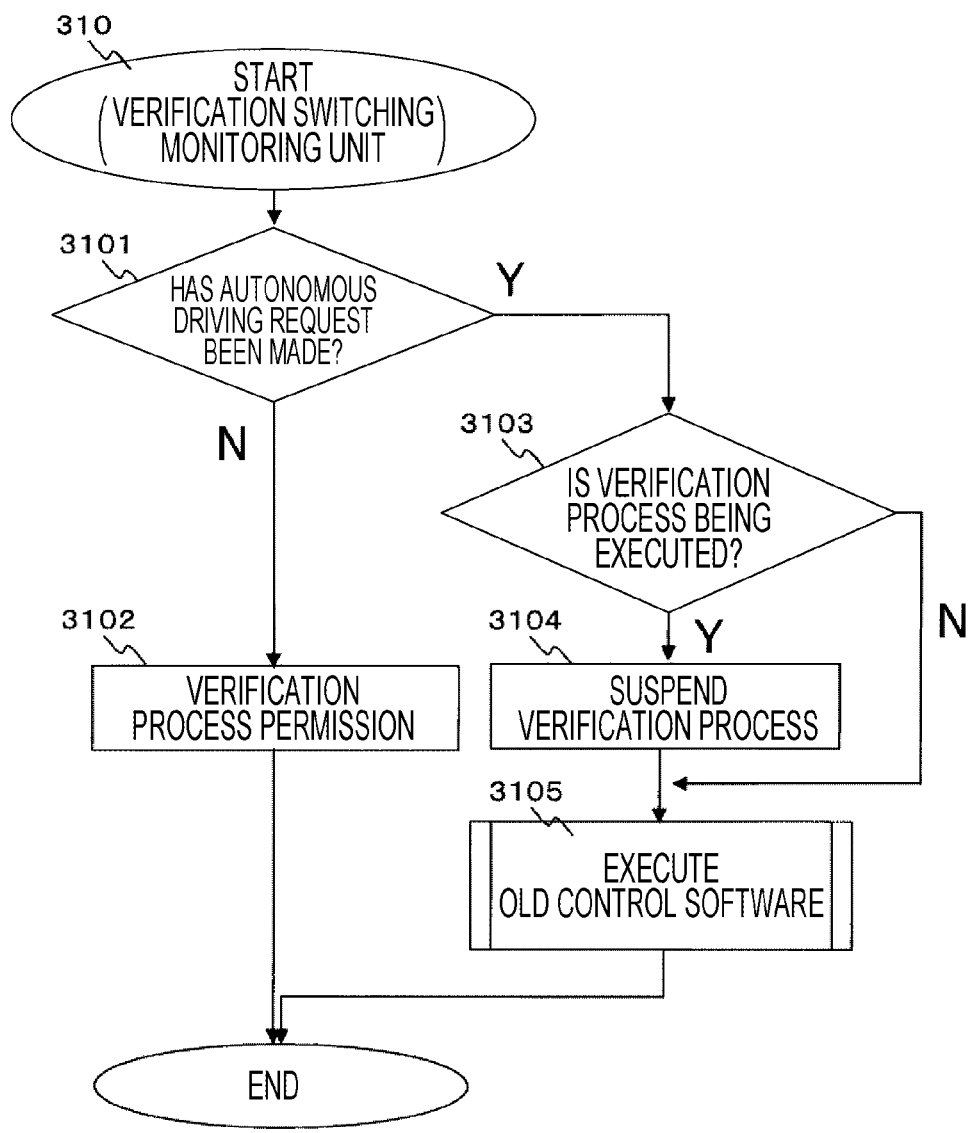
FIG. 22 is an operation flow of a verification switching monitoring unit according to the third embodiment.

FIG. 22 is an operation flow of the verification switching monitoring unit 310. Steps shown in FIG. 22 will hereinafter be described.

(FIG. 22: Step 3101)

The verification switching monitoring unit 310 determines whether an autonomous driving request has been made. When giving a determination "false" (N: NO), the verification switching monitoring unit 310 proceeds to step 3102, and when giving a determination "true" (Y: YES), proceeds to step 3103. The autonomous driving request is an event of, for example, the driver's pressing an autonomous driving start button.

(FIG. 22: Step 3102)

The verification switching monitoring unit 310 issues a verification process permission. Specifically, when the verification process is suspended, it is restarted, and when the verification process is already in execution, it is continued.

(FIG. 22: Step 3103)

The verification switching monitoring unit 310 determines whether the verification process is currently being executed. When giving a determination "true" (Y: YES), the verification switching monitoring unit 310 proceeds to step 3104, and when giving a determination "false" (N: NO), proceeds to step 3105.

(FIG. 22: Step 3104)

The verification switching monitoring unit 310 stops the verification process currently being executed.

(FIG. 22: Step 3105)

The verification switching monitoring unit 310 executes old control software.

Figure 23:
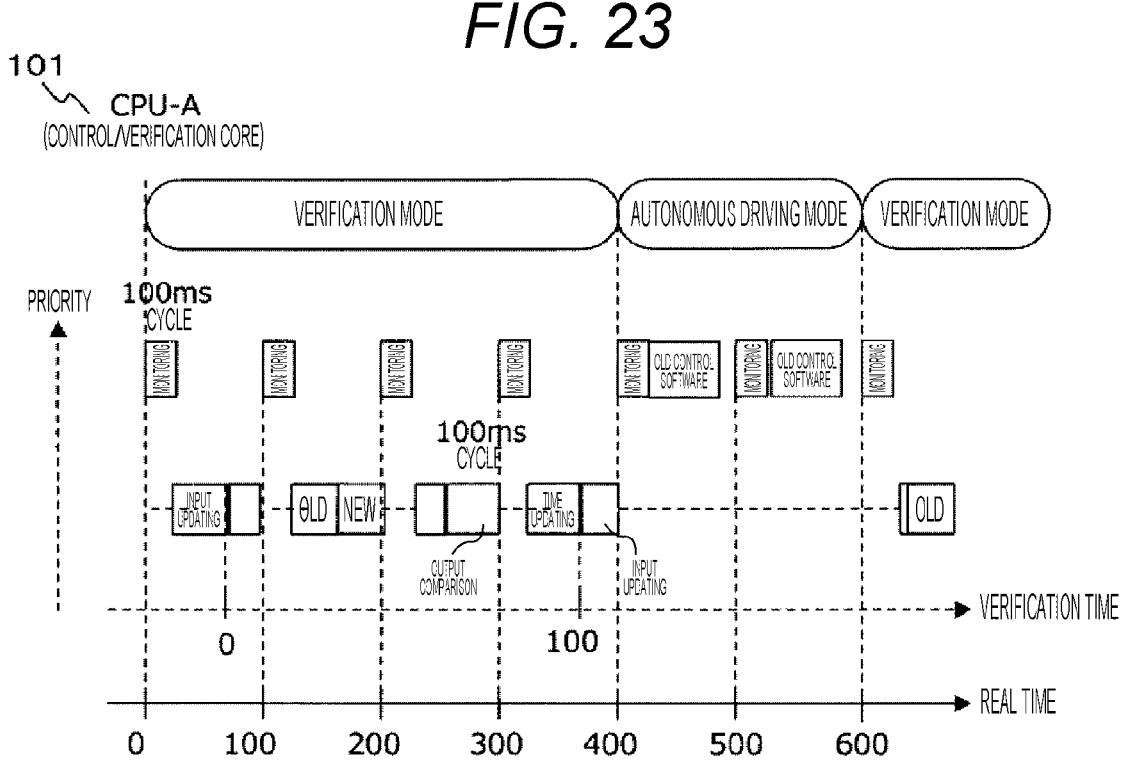
FIG. 23 is scheduling information of the vehicle control device according to the third embodiment.

FIG. 23 is scheduling information of the autonomous driving ECU 31 according to the third embodiment. In the third embodiment, all processes are executed by the CPU-A 101. The verification process is executed in a verification mode but is not executed in an autonomous driving mode. The verification mode is, for example, a mode in which battery charging is in progress, manual driving is in progress, or the like.

In other words, the output verification unit executes the verification process, using idle resources (time, CPU), when the old control software unit is not in execution.

This avoids simultaneous processing by the old control software unit 101 and the old control software unit 102, thus suppressing memory consumption.

According to the third embodiment, the old control software unit in an idle state and new control software unit can be verified using different CPUs, respectively. A time required for the verification, therefore, can be shortened.

Fourth Embodiment

Figure 24:
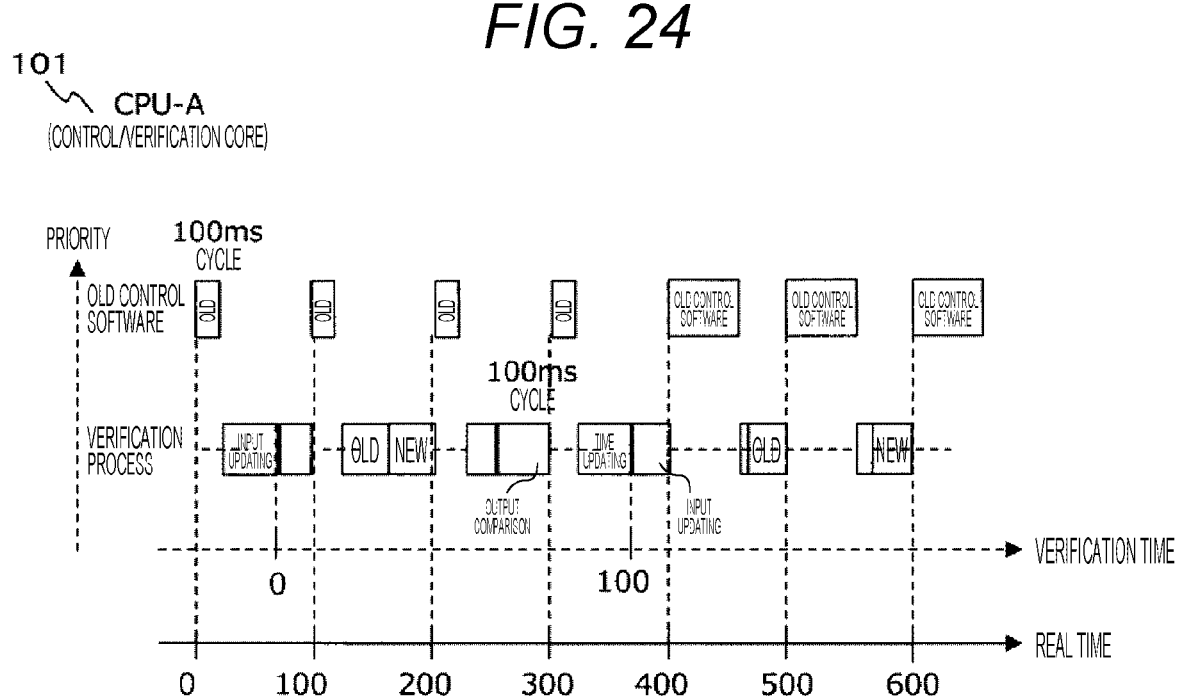
FIG. 24 is scheduling information of the vehicle control device according to a fourth embodiment.

FIG. 24 is scheduling information of the autonomous driving ECU 11 according to a fourth embodiment. In the fourth embodiment, all processes are executed by the CPU-A 101. The verification process is executed in a time zone in which the old control software unit is in an idle state (e.g., when no person or car is present around the vehicle). Setting is made on an operating system to give high process execution priority to the old control software unit. This allows the verification process to be executed without affecting the old control software unit.

It should be noted that the present invention is not limited to the above embodiments but includes various modifications. For example, the above embodiments have been described in detail for easy understanding of the present invention, and are not necessarily limited to an embodiment including all constituent elements described above. Some constituent elements of a certain embodiment may be replaced with constituent elements of another embodiment, and a constituent element of another embodiment may be added to a constituent element of a certain embodiment. In addition, some of constituent elements of each embodiment can be deleted therefrom or add to or replaced with constituent elements of another embodiment.

Some or all of the above-described constituent elements, functions, and the like may be provided in the form of hardware, such as properly designed integrated circuits. In addition, the above-described constituent elements, functions, and the like may be provided in the form of software-based programs by causing a processor to interpret and execute programs for implementing the functions. Information for implementing functions, such as programs, tables, and files, may be stored in a storage device, such as a memory, a hard disk, and a solid state drive (SSD), or in a recording medium, such as an IC card, an SD card, and a DVD.

The embodiments of the present invention may be implemented in the following modes.

(1) A vehicle control device comprising: a verification management unit that executes an old control software unit representing an old version of control software and a new control software unit representing a new version of control software in sequence or in parallel; and an output verification unit that compares respective output values from a plurality of the control software units and that when the output values do not match, outputs information indicating the output values' not matching.

(2) The vehicle control device according to (1), wherein a verification process is executed in an idle time resource in which control application processing, such as autonomous driving, is not executed.

(3) The vehicle control device according to (1), wherein the verification management unit manages an execution time in a verification period (in-verification time), and executes a plurality of the control software units, based on the in-verification time.

(4) The vehicle control device according to (1), comprising: a time-series test input saving unit that saves an input value acquired by a sensor of a running vehicle in a time-series input value in a time-series manner; and a time-series test case defining unit that selects a test case in accordance with the verification execution time of the control software unit and with software to be verified.

(5) The vehicle control device according to (1), comprising an output comparing unit that when the outputted information is information indicating the output values' not matching, outputs the time-series input value to outside.

(6) The vehicle control device according to (2), wherein executing a verification process in the idle time resource means executing the verification process by a CPU different from a CPU that executes control application processing, such as autonomous driving.

(7) The vehicle control device according to (1), wherein the execution in sequence means executing an old control software unit in a certain period of an in-verification time and then executing a new control software unit in a certain period of an in-verification time, or, contrary to that, executing a new control software unit in a certain period of an in-verification time and then executing an old control software unit in a certain period of an in-verification time.

(8) The vehicle control device according to (1), wherein the execution in parallel means allocating the old control software unit and the new control software unit respectively to different CPUs and executing both software units in synchronization with each other, using the same test input data.

(9) The vehicle control device according to (2), comprising the verification management unit that executes a verification process with priority lower than priority of control application processing, such as autonomous driving.

(10) The vehicle control device according to (1), wherein when a time loss arises in an in-verification time at switching from execution of the old control software unit to execution of the new control software unit or vice versa, the in-verification time is counted backward and test input data is changed according to the in-verification time counted backward.

(11) The vehicle control device according to (1), wherein the output comparing unit compares an output value from the old control software unit with an output value from the new control software unit, or compares an output value with a correct answer value and outputs a result of the comparison.

(12) The vehicle control device according to (1), wherein the correct answer value is defined as a given value or range.

(13) The vehicle control device according to (1), wherein the correct answer value refers to a condition posing a possibility of reaching an unsafe state.

(14) The vehicle control device according to (1), wherein the idle time resource is used for a manual driving mode, a charging mode, a preceding vehicle following mode, and a parking mode.

In other words, the vehicle control device includes a time-series test input saving unit that saves sensor information for a certain period of time in a time-series manner in an onboard configuration, a time-series test case defining unit that generates a test case from the saved time-series sensor information, a verification management unit that executes old control software and new control software in the test case, based on an in-verification time different from a real time, and an output comparing unit that compares output results to identify an execution condition that affects the precision of control software.

According to this vehicle control device, verification of new control software, i.e., a new version of control software can be carried out without hindering the operation of autonomous driving software (old control software) that controls the vehicle. Because verification is carried out using an idle resource (time, CPU) not used for executing the old control software, an autonomous driving system can be verified as verification cost is kept low.

REFERENCE SIGNS LIST 1 autonomous driving system
2 autonomous driving system
3 autonomous driving system
15 cloud
101 old control software unit
102 old control software unit
104 new control software verification output value
105 old control software verification output value
106 new control software verification input value
107 old control software verification input value
108 time-series input value
109 old control software input value
111 old control software unit
112 old control software unit
113 new control software unit
114 sensor value reception unit 115 verification management unit
116 time-series test input saving unit
117 time-series test case defining unit
118 output comparing unit
119 transmission unit
121 sensing unit
131 transfer processing unit
141 control processing unit
151 information saving unit
212 old control software unit
213 new control software unit
215 verification management unit
310 verification switching monitoring unit

The invention claimed is:

1. A vehicle control device comprising:
a memory;
a plurality of processors;
wherein the plurality of processors are configured to:
   manage an in-verification time that is a time from a verification flag being switched on to the in-verification time exceeding a verification end time;
   save a time-series input value that is an input value acquired by a sensor of a running vehicle in a time-series manner in the memory;
   determine whether a processor load of a processor of the plurality of processors becomes equal to or smaller than a preset processor load value;
   execute, by the processor, an old control software program representing an old version of control software and a new control software program representing a new version of control software in sequence or in parallel based on the time-series input value in the memory and the in-verification time when the processor load becomes equal to or smaller than the preset processor load value; and
   output information indicating that output values are not matching when an output value from the old control software program and an output value from the new control software program do not match.

2. The vehicle control device according to claim 1, wherein the processors are further configured to execute a verification process, using an idle resource of the plurality of processors.

3. The vehicle control device according to claim 2, wherein the processors execute the verification process by a processor different from the processor for control that executes the old control software program.

4. The vehicle control device according to claim 1, comprising:
   a time-series test case defining program that selects a test case from the time-series input value, the test case including an input value corresponding to the in-verification time.

5. The vehicle control device according to claim 4, wherein the output information is transmitted to an outside system when the output value from the old control software and the output value from the new control software do not match.

6. The vehicle control device according to claim 1, wherein execution in sequence means executing the old control software program in a certain period of the in-verification time and then executing the new control software program in the certain period, or executing the new control software program in the certain period and then executing the old control software program in the certain period.

7. The vehicle control device according to claim 1, wherein execution in parallel means allocating the old control software program and the new control software program respectively to different processors and executing both software programs in synchronization with each other, using a same test case.

8. The vehicle control device according to claim 1, wherein the processors compare an output value from the old control software program with an output value from the new control software program, and when these output values do not match, outputs information indicating that the output values are not matching.

9. The vehicle control device according to claim 1, wherein the processors compare an output value from the old control software program and an output value from the new control software program respectively with a correct answer value, and when at least one of results of the comparison indicates that the output value is different from the correct answer value, outputs information indicating that the output value is not matching the correct answer value.

* * * * *